WIRE FEED DEVICE

Filed Jan. 26, 1965

Inventors:
Charles Fredrick Miller
Robert Edwin Genter
By Bair, Freeman & Molinare Attys.

3,307,761
WIRE FEED DEVICE

Charles Fredrick Miller and Robert Edwin Genter, both of La Habra, Calif., assignors to Basic Products Corporation, Milwaukee, Wis.

Filed Jan. 26, 1965, Ser. No. 428,132
7 Claims. (Cl. 226—7)

This invention relates to a device and method for feeding or transporting wires or filaments, particularly fine wire to be threaded into a minute orifice of an assembly machine. The invention has particular applicability for machines for bonding wires by stitch bonding to semi-conductor devices including ceramic headers wherein small gage wire must be threaded into the capillary of a bonding tool and continuously or intermittently fed to the tool as wire is consumed in the bonding operation.

Semi-conductor wire bonding presents particular problems in that ceramic work pieces are small and the wires to be bonded are so minute that all operations must be done under a microscope. In stitch bonding, wire is played out from a source, usually a coil or spool, through the tip of a bonding tool which moves vertically to contact a heated ceramic work piece and by pressure creates a bond between the wire and the work piece. The bonding tool is then raised and moved to a new bonding position, fresh wire being simultaneously fed down through the tool from the wire source. Such process is repeated until the final bond on any one work piece is made at which time the wire is cut or burned by special shears or torches which leave a short tail at about 90° to the main wire or an enlarged globule on the end of the wire preventing the wire from becoming unthreaded as the tool is moved preparatory to operation on the next work piece.

It is essential that the wire be initially easily and accurately fed to the bonding tool and that the drag on the wire during the bonding operations be sufficient at all times to keep the wire taut while still permitting the wire to feed from the source as needed without rupture.

It is thus an object of this invention to provide a mechanism by which small gage wire may be easily fed to a bonding tool.

Another object of this invention is to provide a simplified method of threading a minute orifice which derives from an improved technique of feeding wire from a feeder assembly.

It is a further object of this invention to provide a wire feed mechanism by which small gage wire may be kept taut during stitch bonding while at the same time preventing rupture of the wire as it is fed through a bonding tool.

Other objects of the invention will become apparent as it is hereinafter described.

The invention consists of a vibratory means in contact with wire by which wire is moved by periodic vibrations. Movement of the wire is accomplished by vibrating a feeder assembly electromagnetically or mechanically in a plane inclined to the axis of the wire. Inertia thereby imparted to the wire causes it to move along its axis in short discrete steps. Adjustment of the amplitude, wave form and frequency of vibration, in conjunction with a vacuum drag system hereinafter described, determine the velocity with which the wire moves.

In conjunction with the vibratory feeder there is provided a vacuum drag system by which is effected resistance of the wire to movement along its longitudinal axis. Drag on the wire is provided by air flowing around the wire to a vacuum system through a tapered groove which supports and guides the wire. The groove may be shaped to form a venturi, thus increasing the velocity of air and improving effectiveness of the drag system.

The invention will be better understood from the drawings wherein.

Figures 1, 2, 3, 4:
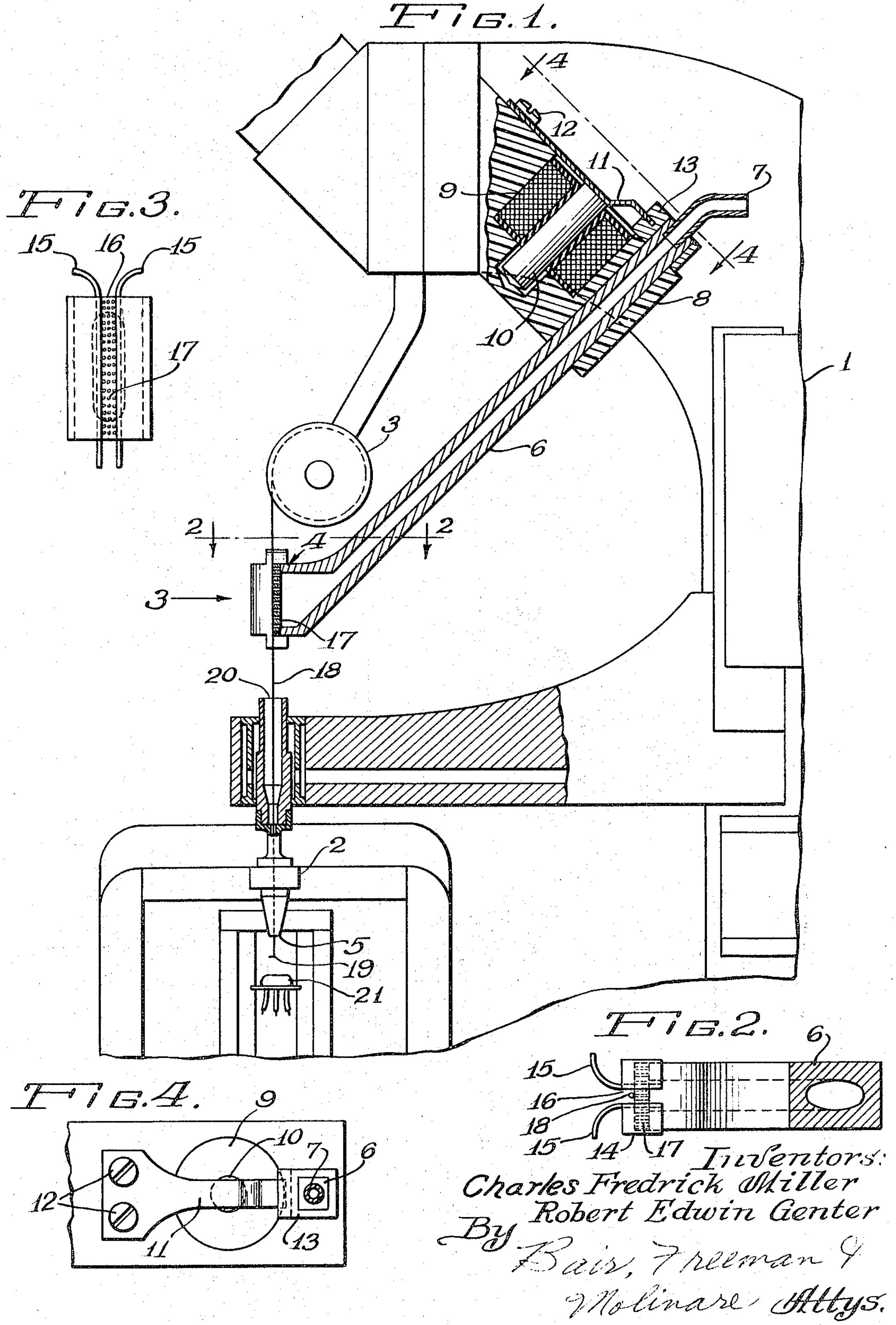
FIG. 1 is a partial side view, partially in section, of a wire bonding machine including the invention.
FIG. 2 is a top view of part of the vibrator assembly along line 2—2 of FIG. 1.
FIG. 3 is an end view of the vibrator assembly along line 3—3 of FIG. 1.
FIG. 4 is a top view of the vibrator assembly along line 4—4 of FIG. 1.

A wire bonding machine shown generally at 1 in which the invention is particularly useful comprises a bonding head 2, wire storage means 3, and a vibratory feed and vacuum drag system shown generally at 4. The bonding head 2 has a tip portion 5 with a minute orifice through which wire is fed. Bonding head 2 is moved vertically up and down by suitable pneumatic, mechanical or hydraulic means, preferably by an air spindle with air bearings as described in copending application Serial No. 437,980, filed March 8, 1965. Wire storage means 3, shown diagrammatically, may be a spool or drum which rotates about its axis to feed wire downwardly to head 2, as for example, as described in copending application Serial No. 437,134, filed March 4, 1965.

The vibratory feed and vacuum drag system shown generally at 4 consists of a hollow tubular member 6 with its open end 7 connected to a vacuum system or system of reduced pressure (not shown). Tubular member 6 at its upper end slidably fits into block 8 wherein member 6 is free to move axially. An electromagnetic coil 9 with core 10 is housed in block 8 above tubular member 6. Cantilever spring 11 is secured at one terminus to block 8 by bolt 12 and at the other terminus to a collar 13 secured to the upper end of member 6. Spring 11 is attached at its mid-portion to core 10 which is adapted to move axially within coil 9. As shown in FIG. 1, core 10 and spring 11 are in their lowermost position with collar 13 being flush with the upper surface of block 8. On energizing coil 9 by suitable means (not shown), core 10 tends to center itself by rising and spring 11 and tubular member 6 are simultaneously lifted. On de-energizing coil 9, spring 11 moves core 10 and tubular member 6 back to their initial positions as shown in FIG. 1. By supplying coil 9 with alternating current, preferably 60 cycle, tubular member 6 can be made to vibrate along its axis.

At the lower end of tubular member 6 there is provided a portion of generally rectangular cross-section 14. As best seen in FIG. 2, the outer part of portion 14 consists of guide vanes 15 terminating in groove 16 into which a wire can lay. Porous plate 17 slides vertically into portion 14 fitting snuggly therein and provides resistance to air flow from the atmosphere through tubular member 6 to the vacuum system. Porous plate 17 is a resilient or semi-resilient material permitting passage of air and providing support by friction for a wire in contact therewith. Preferably the plate may be porous plastic, sintered metal, wire screen, or drilled, pierced or grooved material of suitable density.

As air is drawn through tubular member 6 and porous plate 17, wire 18 is attracted into groove 16 and is held against plate 17. The combination of air flow plus friction between the plate end wire puts drag on the wire, and by controlling the pressure drop across plate 17 the drag of the wire may be controlled.

In operation of the vibratory feeder as hereinafter described, the feeder is a separate mechanism from the bonding head and its force system. Vibratory feed is performed initially to load the wire from the spool down through the spindle and needle of the bonding head. Feed is activated when required. Initially, it is signaled by a switch which turns on the vibrator.

During the bonding operation, the vibratory feeder no longer operates as a vibrator but the vacuum system is maintained to supply drag on the wire. Vibratory feed is not required since wire is drawn by the bonding tip 5 contacting the bent tail 19 or globule, which pulls wire through the bonding tip 5 during movement to subsequent bonds.

The first step of the bonding operation is threading wire from spool 3 to bonding tool 2 through bonding tip 5. The vacuum system is actuated and wire is manually laid into groove 16. Electromagnetic coil 9 is energized with alternating current and tubular member 6 vibrates axially, exerting on the wire a periodic force with a downward component, thus causing the wire to move down by short discrete movements to the top of bonding tool 2 into opening 20 and down through the spindle of tool 2 to tip 5. Gravity aids in moving the wire downward. The vibrator is then inactivated and a short tail 19 as shown in FIG. 1 is put on the wire end by a notched shear blade (not shown). The vacuum drag system is maintained throughout the bonding operations.

To bond, the head 2 is lowered and passes along the wire until tip 5 contacts bent tail 19. The tip then moves the wire, by virtue of contact with the bent tail, to the work shown diagrammatically at 21 as a ceramic header. A bond is effected by forcing tip 5 to press the wire against the heated work piece. Successive bonds on the same work piece are made by lifting head 2 and drawing out wire to a new location. After making the last bond on a given work piece, the wire is cut and a new tail is formed.

Drag is required during the bonding operation to hold the wire stationary after cutting so the bonding tip will pass along the wire until the needle end engages the bent tail. Drag is also necessary to control the lay of the wire during movement of the tip to subsequent bonding positions. However, in both of these operations, the drag must be controlled to a very fine degree. In the initial movement utilizing the bent tail, too great drag will cause the bent tail to be straightened out. In subsequent movement from one bond position to the next, excessive drag will cause either a ruptured wire or bond.

The necessary drag control is achieved by use of porous plates of varying porosity and by varying the degree of vacuum to effect varying degrees of laminer flow through the porous member.

What is hereinabove shown and described is the preferred embodiment of the invention, it being understood that various changes may be made in the present invention without departing from the underlying idea or principles of the invention within the scope of the appended claims.

We claim:

1. Device for transporting and feeding wire comprising a tube, means for axially vibrating said tube, a source of reduced pressure communicating with one end of said tube, means at the other end of said tube defining a groove adapted to hold wire, means including a porous plate between said groove and said source of reduced pressure for contacting said wire, said wire being held against said plate by flow of gas through said groove and plate to said source of reduced pressure.

2. Device as described in claim 1 wherein said tube vibrates in a plane inclined to the axis of said wire causing said wire to move along its axis in short discrete steps.

3. Device as described in claim 1 wherein the axis of said wire is substantially vertical as held against said plate and wherein said tube vibrates in a plane inclined to the vertical to move said wire vertically downward in short discrete steps.

4. Device as described in claim 1 wherein the means for vibrating the tube includes an electromagnet.

5. Device for transporting and feeding wire comprising a tube, means including an electromagnet adapted to vibrate said tube axially, a source of reduced pressure communicating with one end of said tube, means at the other end of said tube communicating with the atmosphere and defining a substantially vertical groove adapted to hold wire, means including a porous plate between said groove and said source of reduced pressure for containing said wire, said wire being held against said plate by flow of air from the atmosphere through said groove and plate to said source of reduced pressure, thereby providing resistance against vertical movement of said wire.

6. Method of transporting and feeding wire for threading into an orifice comprising the steps of (1) holding wire against a surface permeable to gas by flowing gas around said wire and through said surface, and (2) vibrating said surface in a plane inclined to the longitudinal axis of said wire whereby inertia imparted to said wire causes it to move in short discrete steps in a direction parallel to its own longitudinal axis.

7. Method of claim 6 wherein said groove and wire are oriented substantially vertically whereby the wire moves down under the combined forces of gravity and inertia imparted through vibration.

References Cited by the Examiner

UNITED STATES PATENTS

| | | | |
|---|---|---|---|
| 2,560,918 | 7/1951 | Bedford et al. | 226—95 |
| 2,625,934 | 1/1953 | Halliday | 226—158 X |
| 2,994,244 | 8/1961 | Hay | 226—120 X |
| 3,203,379 | 8/1965 | Dedmon et al. | 226—158 X |

M. HENSON WOOD, Jr., *Primary Examiner.*

J. N. ERLICH, *Assistant Examiner.*